United States Patent

[11] 3,593,157

[72] Inventor Henry R. Kosakowski
Lyndhurst, N.J.
[21] Appl. No. 828,927
[22] Filed May 29, 1969
[45] Patented July 13, 1971
[73] Assignee The Bendix Corporation

[54] VOLTAGE-CONTROLLED FREQUENCY DIVIDER
9 Claims, 2 Drawing Figs.

[52] U.S. Cl. .......... 328/41, 328/127, 328/186
[51] Int. Cl. .......... H03k 25/02
[50] Field of Search .......... 307/225, 227, 247; 328/127, 186, 41

[56] References Cited
UNITED STATES PATENTS

| | | | |
|---|---|---|---|
| 2,527,342 | 10/1950 | White | 328/127 X |
| 2,909,676 | 10/1959 | Thomas | 307/225 |
| 3,113,221 | 12/1963 | Okuda | 307/225 |
| 3,351,781 | 11/1967 | Johnson | 307/225 |
| 3,382,375 | 5/1968 | Dischert | 307/225 |
| 3,403,268 | 9/1968 | Beckner | 307/247 X |

*Primary Examiner*—John S. Heyman
*Attorneys*—Ronald G. Gillespie and Plante, Hartz, Smith and Thompson

ABSTRACT: A frequency divider comprising a one-shot multivibrator operated by a fixed frequency pulse train applied to one of its inputs and controlled by a voltage signal to provide an output pulse train having a frequency corresponding to the voltage signal. The output pulse train is fed back to a second input of the multivibrator through a decay network to switch the multivibrator and the decay time *t* is controlled by the voltage signal. The frequency of the output pulse train is determined by the decay time *t* is controlled by the voltage signal. The frequency of the output pulse train is determined by the decay time *t* and varies from 1/*t* c.p.s. to the frequency of the input pulse train as determined by the magnitude of the voltage signal.

INVENTOR.
HENRY R. KOSAKOWSKI
BY
Ronald G. Gillespie
ATTORNEY

INVENTOR.
HENRY R. KOSAKOWSKI
BY
Ronald G. Gillespie
ATTORNEY

VOLTAGE-CONTROLLED FREQUENCY DIVIDER

BACKGROUND OF THE INVENTION

1. Field of the Invention

The invention relates to frequency conversion systems and, more particularly, to a frequency divider.

2. Description of the Prior Art

A voltage-triggered frequency generator is shown in U.S. Pat. No. 2,748,272 issued to N. B. Schrock on May 29, 1956, but it differs substantially from the present invention. The Schrock device is a frequency generator using control voltages to trigger a multivibrator for controlling the frequency of an output signal.

The present invention differs from the Schrock device in that the present invention is a frequency divider and not a frequency generator. The present invention uses a pulse train of fixed frequency to operate a multivibrator and uses control voltages to determine the RC decay time of a feedback signal for switching the multivibrator to control the output frequency. Control voltages as disclosed in the Schrock patent could not be used in the frequency divider of the present invention.

SUMMARY OF THE INVENTION

The invention contemplates a frequency divider comprising switching means having an input for receiving a fixed frequency pulse train and providing a pulse train at its output having a frequency corresponding to a control voltage, feedback means including a decay circuit connecting the output of the switching means to the input for feeding back pulses for controlling the switching means, and a control voltage source connected to the decay circuit for controlling the decay time of the feedback pulses to control the frequency of the output pulse train.

One object of the present invention is to provide a frequency divider which provides an output pulse train having a frequency corresponding to a control voltage.

Another object of the present invention is to provide a frequency divider in which the output pulse train is fed back to the input through a decay network and the decay time of the pulses is controlled by a control voltage.

Another object of the invention is to provide a frequency divider in which the output frequency of the pulse train can be varied accurately in response to the control voltage from a frequency corresponding to the reciprocal of the time constant of the decay circuit to the frequency of the input pulse train.

Another object of the invention is to provide a voltage divider which provides a frequency variation over a substantially large range.

Another object of the invention is to provide a frequency divider including switching means which is positively controlled and does not respond to noise.

Another object of the invention is to differentiate the fixed frequency pulse train and apply the differentiated pulse train to the input of the switching means with the feedback pulse train to positively control switching of the switching means.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
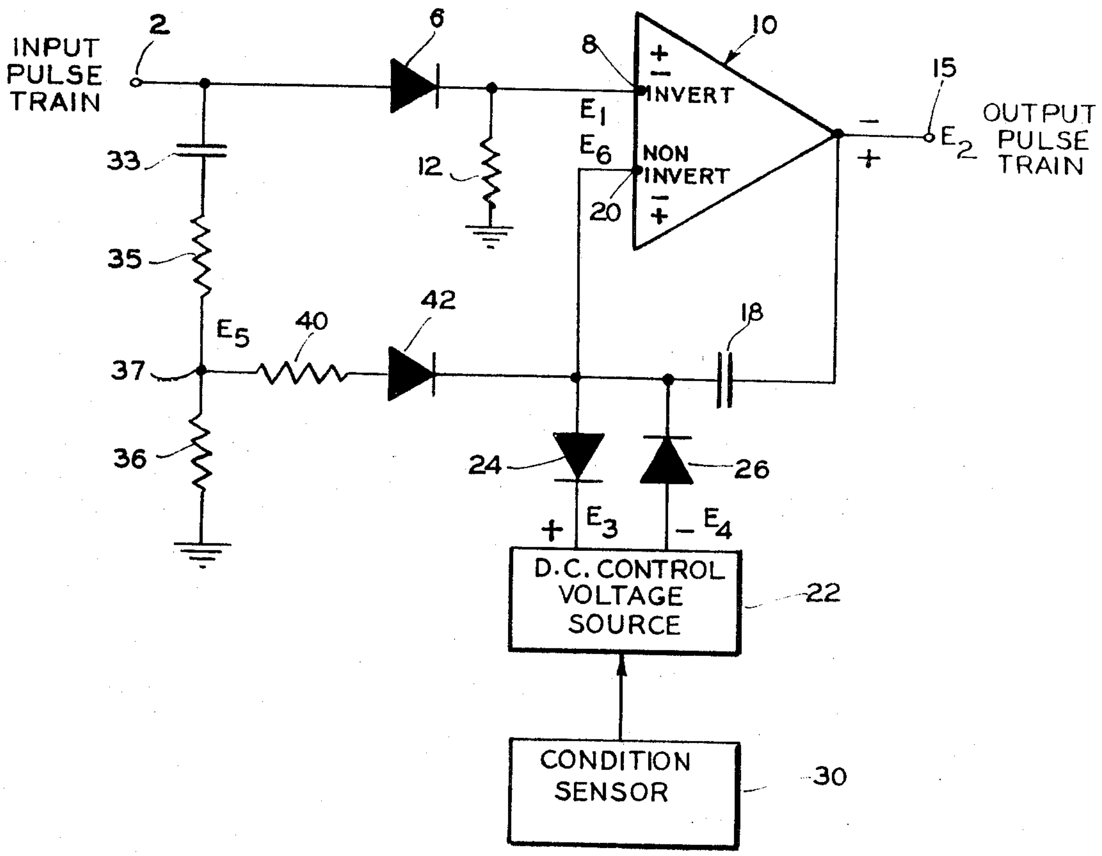
FIG. 1 is a schematic diagram of a novel voltage-controlled frequency divider constructed in accordance with the present invention.
Figure 2:
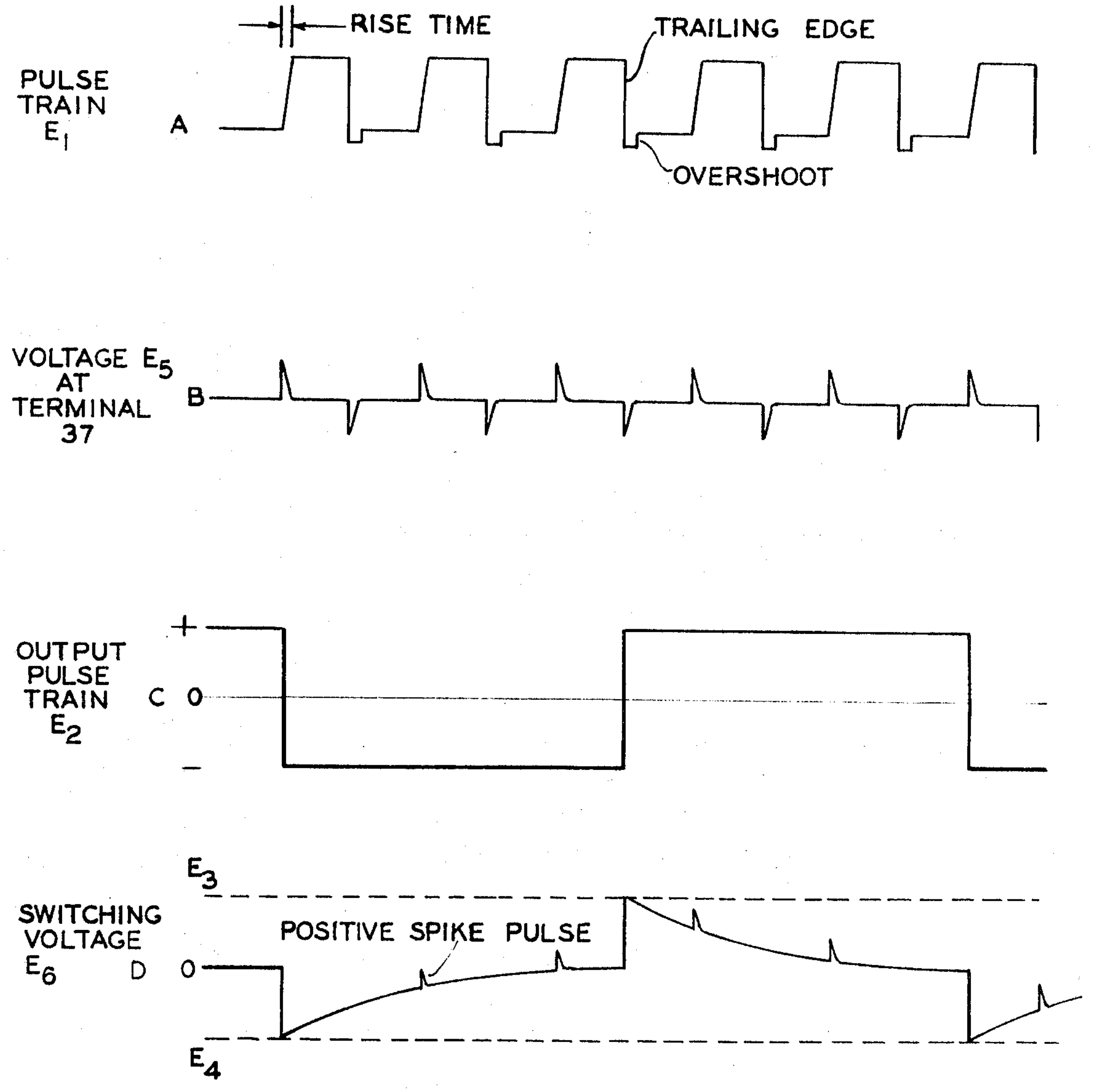
FIG. 2 shows the waveforms of the voltages and pulse trains at various stages of the novel voltage-controlled frequency divider shown in FIG. 1.

Referring to FIG. 1 there is shown a novel voltage-controlled frequency divider operated by a fixed frequency input pulse train applied at a terminal 2 through a diode 6 to an inverting input 8 of an operational amplifier 10. Diode 6 passes only positive pulses to amplifier 10 as a pulse train $E_1$, as shown in FIG. 2A, and a resistor 12 connected to inverting input 8 of operational amplifier 10 and to ground limits the amplitude of the positive pulses of pulse train $E_1$. A pulse train $E_2$, shown in FIG. 2C, appears at an output 15 of operational amplifier 10.

The output pulse train $E_2$ is applied through a decay feedback circuit including a capacitor 18 to a noninverting input 20 of operational amplifier 10. The decay time of the feedback pulses is controlled by direct current control voltages $E_3$, $E_4$ from a source 22 applied through diodes 24 and 26 to the decay circuit to limit the feedback pulses to the amplitude of the control voltages. The amplitudes of voltages $E_3$, $E_4$ may be controlled by a condition sensor 30.

To positively control switching of operational amplifier 10 in response to decayed feedback pulses, the input pulse train also is applied to a differentiating and voltage divider network including a capacitor 33 and resistors 35 and 36 connected in series between terminal 2 and ground. A differentiated voltage-controlled pulse train $E_5$ with positive and negative spikes appears at a terminal 37 between resistors 35 and 36 as shown in FIG. 2B.

The differentiated voltage-controlled pulse train $E_5$ is applied through a resistor 40 and a diode 42 to the noninverting terminal 20 of operational amplifier 10 together with the feedback pulses as a switching voltage $E_6$. Diode 42 passes only positive spikes of differentiated voltage-controlled pulse train $E_5$. The switching voltage $E_6$ applied to noninverting input 20 of operational amplifier 10 is shown in FIG. 2D.

Operational amplifier 10 provides positive pulses at output 15 when noninverting input 20 is more positive than inverting input 8 and provides negative pulses at output 15 when inverting input 8 is more positive than noninverting input 20.

OPERATION

The arrangement shown in FIG. 1 is a one-shot multivibrator triggered by pulse train $E_1$ as shown in FIG. 2A. When a positive pulse is applied to input 8 of operational amplifier 10, the output voltage is switched from positive saturation to negative saturation and maintained negative until the feedback voltage at input terminal 20 of operational amplifier 10 decays sufficiently to trip the amplifier to positive saturation. The rate at which the feedback voltage switches the operational amplifier 10 is set by the RC time constant of the feedback circuit and the reference voltages $E_3$, $E_4$ from source 22. By reducing the voltages $E_3$, $E_4$, the voltage swing at input terminal 20 of operational amplifier 10 is reduced so that the time required for the voltage $E_6$ at input terminal 20 to decay is reduced also. A decrease in decay time of the feedback circuit increases the output frequency. If the time constant is set at $t$ seconds, the output frequency will vary from $1/t$ c.p.s. to the frequency of the input pulse train as determined by the magnitude of voltages $E_3$, $E_4$ from voltage source 22.

Initially, the first output pulse of pulse train $E_2$ is positive because terminal 8 of amplifier 10 is more negative than terminal 20. The first input pulse of train $E_1$ causes input 8 to be more positive than input 20 which receives a reduced amplitude positive spike pulse of train $E_5$ and a negative feedback pulse of train $E_2$. The output pulse of train $E_2$ then goes negative as shown in FIG. 2C. The negative feedback pulse of train $E_2$ gradually decreases in amplitude to zero in accordance with voltages $E_3$, $E_4$ and the RC time constant of resistors 36 and 40 and capacitor 18 of the decay feedback circuit. When the negative feedback pulse of train $E_2$ approaches zero, the overshoot of the trailing edge of the corresponding pulse of train $E_1$, shown in FIG. 2A, causes input terminal 8 to be more negative than terminal 20 and the output pulse of train $E_2$ goes positive as shown in FIG. 2C.

The positive feedback pulse decreases in amplitude in accordance with voltages $E_3$, and $E_4$ and the RC time constant of capacitor 18 in the decay circuit and the input resistance of operational amplifier 10 and when a pulse of train $E_1$ at terminal 8 is more positive than the feedback pulse at terminal 20, the pulse train $E_2$ goes negative. The positive spike pulses passed by diode 42 appear on the feedback pulses, as shown in FIG. 2D, so that a positive pulse is required at terminal 8 to switch amplifier 10. The switching occurs at definite point in the rise time of the pulse of train $E_1$ so that switching accuracy is increased and switching in response to noise is avoided.

The cycle repeats continuously and the frequency of pulse train $E_2$ is determined by the decay time of the feedback pulse which depends on the time constant $t$ of the decay feedback circuit and the amplitude of control voltages $E_3$ $E_4$ from source 22. A decrease in amplitude of voltages $E_3$ and $E_4$ decreases the decay time and increases the frequency of pulse signal train $E_2$ at the output 15 of amplifier 10. Pulses of train $E_1$ occurring while the feedback pulses are decaying are ineffective to switch amplifier 10 until the feedback pulses decay sufficiently to permit a pulse of train $E_1$ to switch the amplifier.

A frequency divider constructed according to the present invention provides an output pulse train having a frequency corresponding to a control voltage. The control voltage may be provided in response to any suitable means, such as a condition sensor. The frequency is determined by the decay time of feedback, and the output frequency of the pulse train can be varied accurately in response to the control voltage from a frequency corresponding to the reciprocal of the time constant of the decay circuit to the frequency of the input pulse train.

The frequency may be varied over a substantial range with a low ratio of input frequency to output frequency greater than 3,000 to 1.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What I claim is:

1. A frequency divider comprising
a pulse source for providing pulses at a constant frequency;
a signal source for providing a control signal at a predetermined amplitude;
an operational amplifier having an inverting input terminal connected to the pulse source, a noninverting input terminal connected to the signal source and an output terminal at which output pulses are provided said amplifier being initially saturated in one sense;
a decay circuit having a predetermined time constant and connected intermediate the amplifier output terminal and the signal source, and effective for decaying the amplifier output pulses; and
the amplifier being responsive to the control signal and the decayed output pulses for switching to saturating in the opposite sense at a rate in accordance with the decay circuit time constant and the control signal amplitude for controlling the frequency of the amplifier output pulses.

2. A frequency divider as described in claim 1 which includes means responsive to a condition connected to the control signal source for controlling the amplitude of the control signal so that the frequency of the output pulses corresponds to the condition.

3. A frequency divider of the kind described in claim 1 having means for limiting the amplitude of the decayed output pulses to the amplitude of the control signal.

4. A frequency divider of the kind described in claim 3 in which the limiting means includes diode means connected between the signal source and the decay circuit.

5. A frequency divider of the kind described in claim 1 in which the decay circuit includes a capacitor.

6. A frequency divider of the kind described in claim 5 which includes resistive means cooperating with the capacitor to provide an RC time constant for the decay circuit.

7. A frequency divider as described in claim 1 including differentiating means for differentiating the constant frequency pulses, and means for applying the differentiated pulses to the noninverting input terminal of the amplifier to positively control switching of the amplifier.

8. A frequency divider as described in claim 7 which includes means cooperating with the differentiating means for providing positive spike pulses corresponding to the positive portion of the constant frequency pulses which are applied to the inverting input terminal of the switching means.

9. A frequency divider as described in claim 8 which includes a voltage divider network connected to the differentiating means to limit the amplitude of the spike pulses.